United States Patent [19]
Cloutier

[11] Patent Number: 5,708,856
[45] Date of Patent: Jan. 13, 1998

[54] RENTAL CAMERA WITH LOCKING DEVICE TO DETER CUSTOMER REUSE AFTER COMPLETED EXPOSURE

[75] Inventor: Robert P. Cloutier, Spencerport, N.Y.

[73] Assignee: Eastman Kodak Company, Rochester, N.Y.

[21] Appl. No.: 795,172

[22] Filed: Feb. 4, 1997

[51] Int. Cl.⁶ .................................................. G03B 17/02
[52] U.S. Cl. .............................. 396/6; 396/536; 396/539
[58] Field of Search .................................. 396/6, 535, 536, 396/537, 538, 539, 540, 541

[56] References Cited

U.S. PATENT DOCUMENTS

| | | | |
|---|---|---|---|
| 3,138,080 | 6/1964 | Jacobson | 354/202 |
| 4,666,278 | 5/1987 | Uematsu et al. | 354/288 |
| 5,473,401 | 12/1995 | Tsunefuji | 354/288 |

Primary Examiner—Howard B. Blankenship
Attorney, Agent, or Firm—Roger A. Fields

[57] ABSTRACT

A rental camera is to be used by a customer for picture-taking and is intended to be returned to a lender to unload exposed film and replace with fresh film. The rental camera generally comprises a camera body having a through-hole; a manually operable member supported on the camera body for movement between first and second positions, and having a surface area substantial aligned with the through-hole in the camera body when the manually operable member is in the first position; and a locking device located in the through-hole in the camera body and in the way of the surface area of the manually operable member when the through-hole and the surface area are substantially aligned, to prevent the customer moving the manually operable member from the first position to the second position, and being removable from the through-hole to be out of the way of the surface area to permit movement of the manually operable member from the first position to the second position preparatory to the lender unloading exposed film and replacing with fresh film.

10 Claims, 4 Drawing Sheets

RENTAL CAMERA WITH LOCKING DEVICE TO DETER CUSTOMER REUSE AFTER COMPLETED EXPOSURE

CROSS-REFERENCE TO RELATED APPLICATION

Reference is made to commonly assigned copending application Ser. No. 08/802,075, entitled RENTAL CAMERA WITH KEY-OPENING LOCK TO DETER CUSTOMER REUSE AFTER COMPLETED EXPOSURE and filed Feb. 4, 1997 in the names of Robert P. Cloutier, Ronald H. Kiesow and Stephen G. Malloy Desormeaux.

FIELD OF THE INVENTION

The invention relates generally to the field of photography, and in particular to rental cameras. More specifically, the invention relates to a rental camera with a locking device to deter customer reuse after completed exposure.

BACKGROUND OF THE INVENTION

It is proposed that one of the keys to the success of a camera rental business is to deter the customer from removing the exposed film from a rented camera and reloading fresh film into the rented camera. This responsibility preferably should be left to the lender of the rental camera.

SUMMARY OF THE INVENTION

According to one aspect of the invention, there is provided a rental camera to be used by a customer for picture-taking and intended to be returned to a lender to unload exposed film and replace with fresh film. The rental camera comprises:

a camera body having a through-hole;

a manually operable member supported on the camera body for movement between first and second positions, and having a surface area substantial aligned with the through-hole in the camera body when the manually operable member is in the first position; and a locking device located in the through-hole in the camera body and in the way of the surface area of the manually operable member when the through-hole and the surface area are substantially aligned, to prevent the customer moving the manually operable member from the first position to the second position, and being removable from the through-hole to be out of the way of the surface area to permit movement of the manually operable member from the first position to the second position preparatory to the lender unloading exposed film and replacing with fresh film.

According to another aspect of the invention, there is provided a method of deterring unauthorized reuse of a rental camera to be used by a customer for picture-taking and intended to be returned to a lender to unload exposed film and replace with fresh film. The method comprises the steps of:

aligning a screw-hole in the camera body and a screw-hole in a manually operable member supported on the camera body for movement between first and second positions when the manually operable member is in the first position; and inserting a locking screw into the screw-hole in the camera body and into the screw-hole in the manually operable member when the two screw-holes are aligned, to prevent the customer moving the manually operable member from the first position to the second position, whereby when the locking screw is removed from at least the screw-hole in the manually operable member the manually operable member can be moved from the first position to the second position preparatory to the lender unloading exposed film and replacing with fresh film.

DETAILED DESCRIPTION OF THE INVENTION

The invention is disclosed as being embodied preferably in a still-picture camera. Because the features of a still-picture camera are generally known, the description which follows is directed in particular only to those elements forming part of or cooperating directly with the disclosed embodiment. It is to be understood, however, that other elements may take various forms known to a person of ordinary skill in the art.

Figure 1:
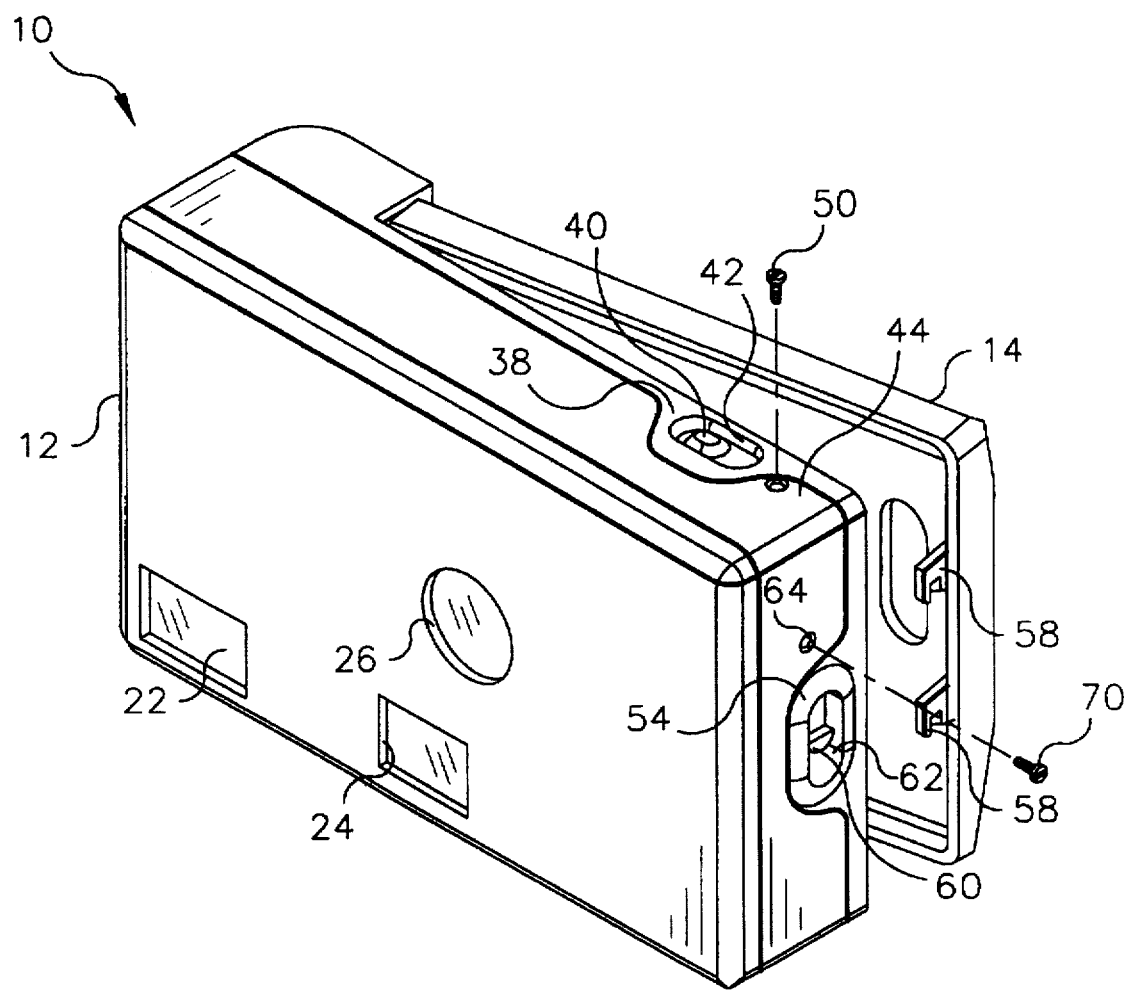
FIG. 1 is an upside down front perspective view of a rental camera which is a preferred embodiment of the invention.
Figure 4:
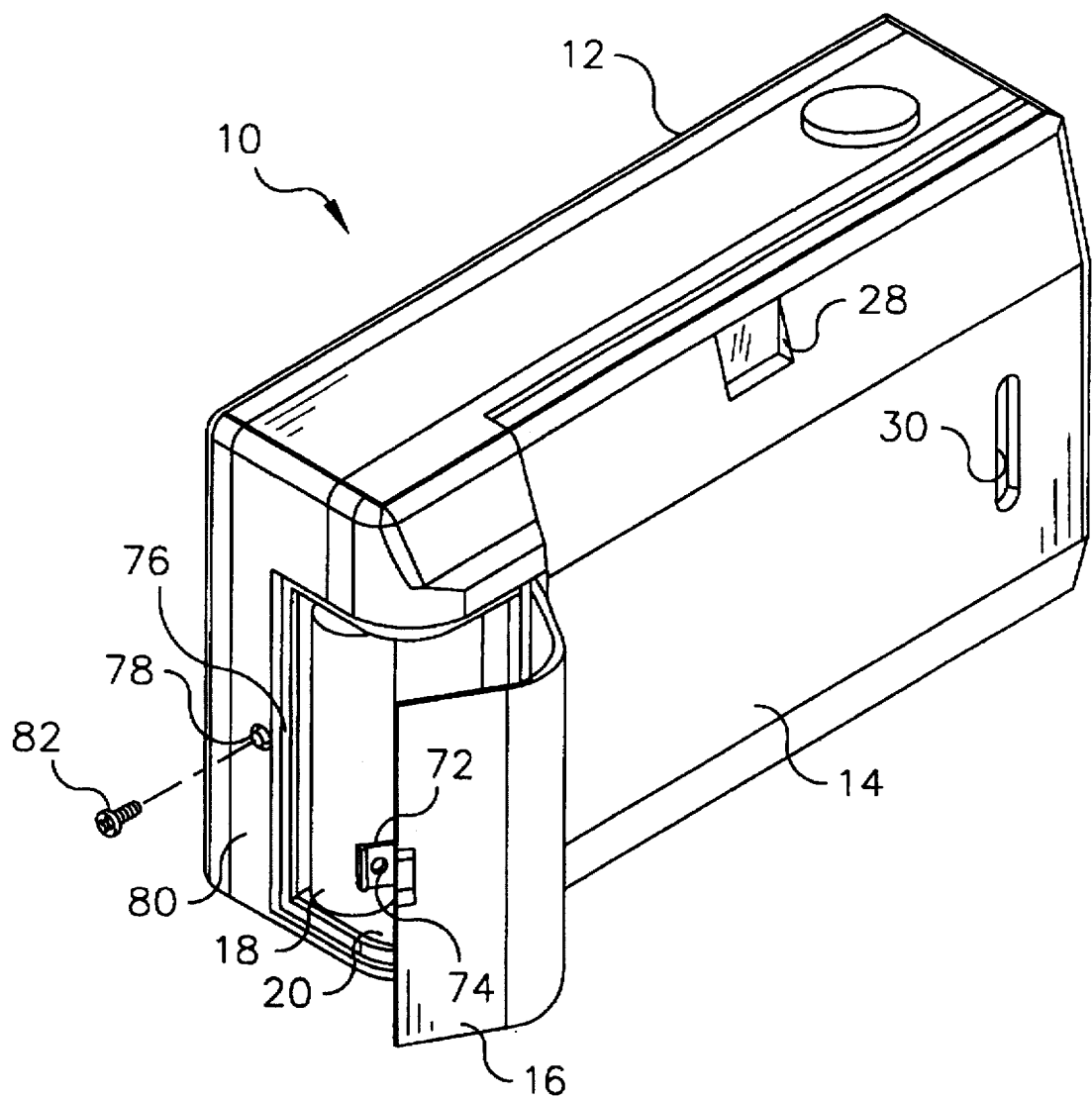
FIG. 4 is an right-side-up rear perspective view of the rental camera.

Referring now to the drawings, FIG. 1 is an upside down front perspective view of a rental camera 10 and FIG. 4 is right-side-up rear perspective view of the camera. The rental camera 10 is to be used by a customer for picture-taking, and then is to be returned to a lender (supplier) to unload exposed film and replace with fresh film.

Figure 2:
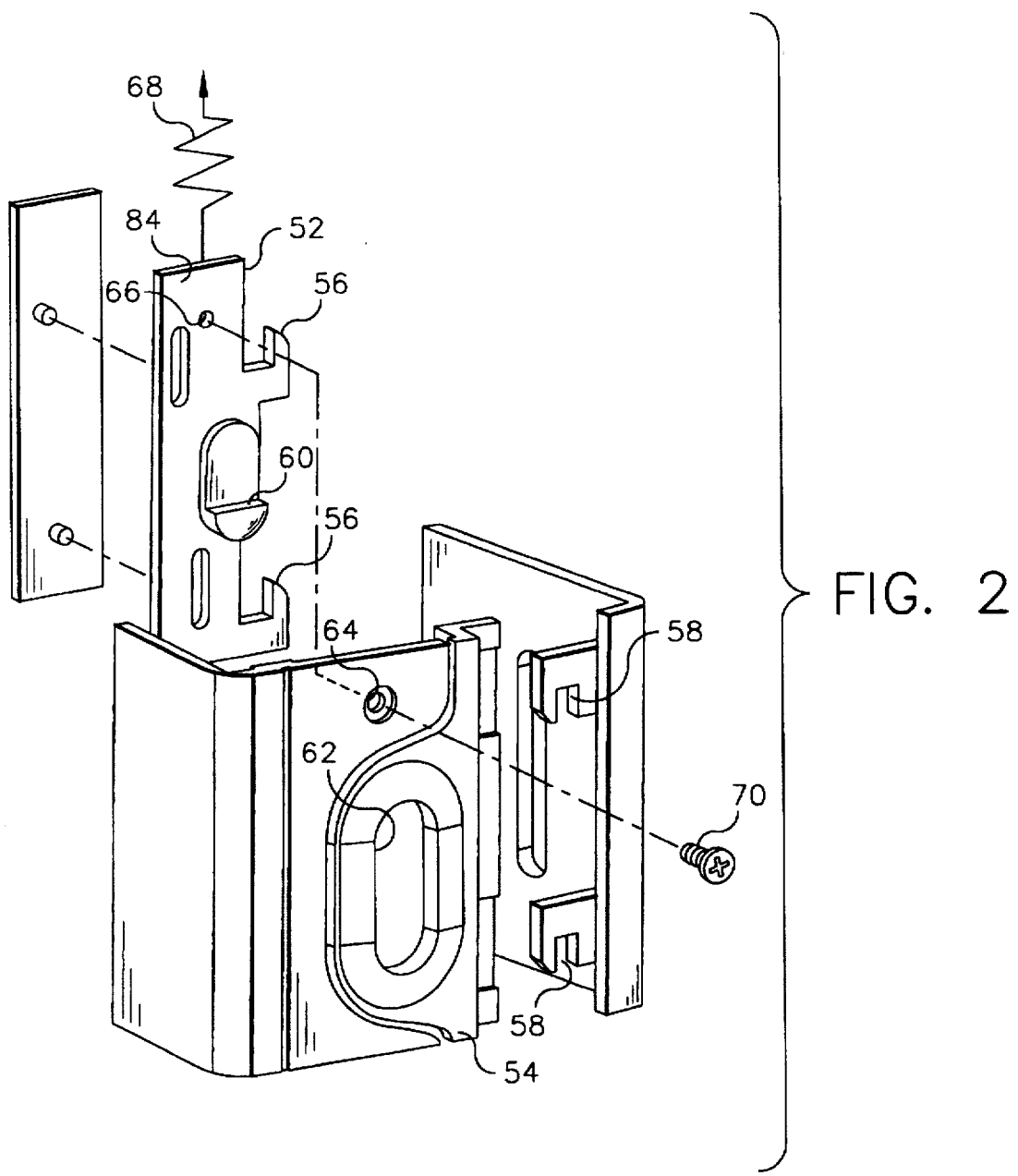
FIG. 2 is an exploded perspective view of a film door locking mechanism of the rental camera.

As shown in FIGS. 1 and 2, the rental camera 10 includes a camera body 12 having a rear film door 14 that is to be opened by the lender in order to remove a 35 mm film cartridge (not shown) with exposed film from the camera body and replace the cartridge with another one containing fresh film. A separate battery door 16 of the rental camera 10 is to be opened by the lender in order to remove an exhausted battery 18 from a battery chamber 20 and insert a new battery into the battery chamber. The front of the camera body 12 has a flash window 22, a front viewfinder opening 24 and a taking lens opening 26. The rear of the camera body 12 has a rear viewfinder opening 28 and a cartridge window 30 for viewing the film cartridge loaded in the camera body.

Figure 3:
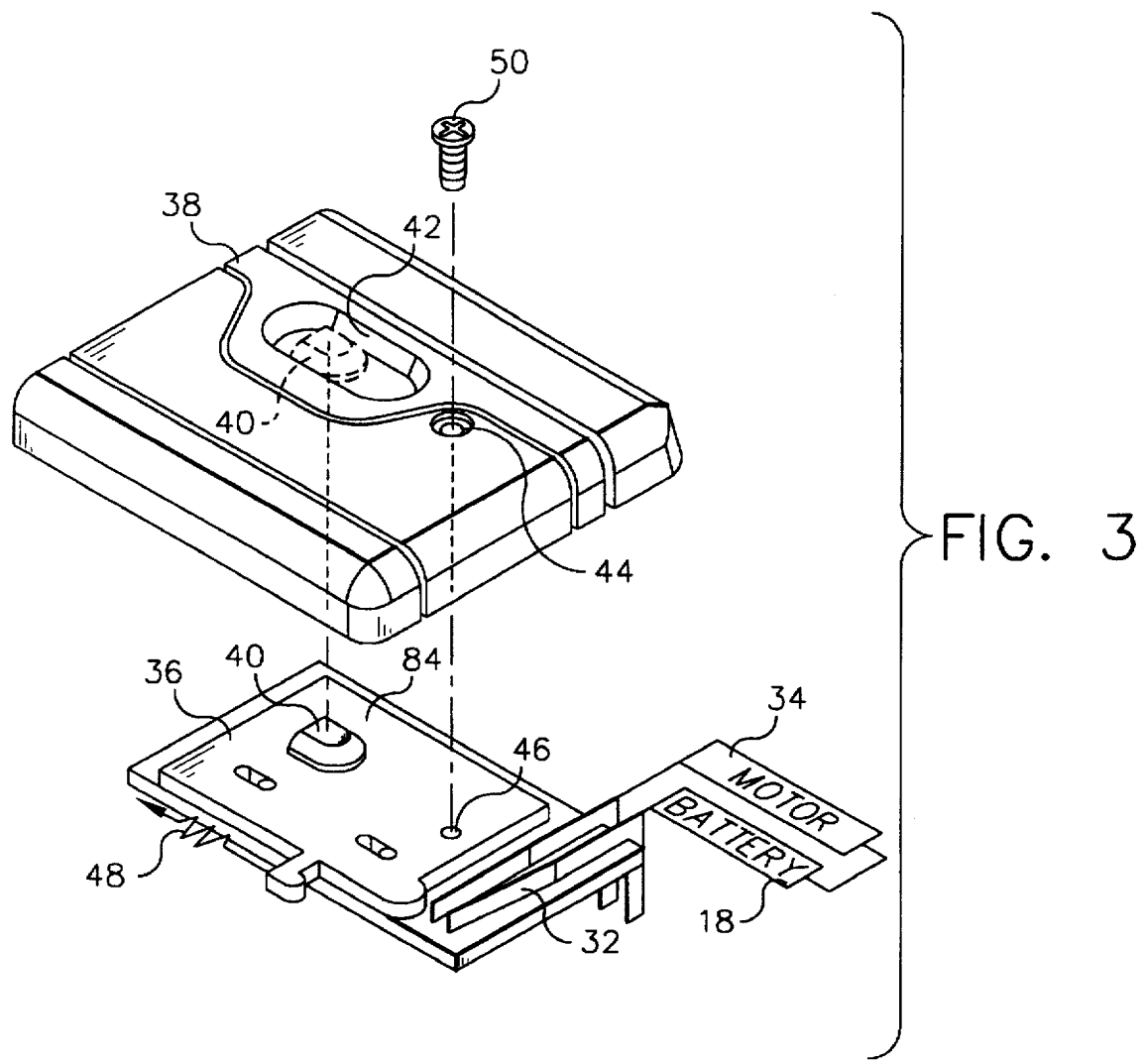
FIG. 3 is an exploded perspective view of film rewind locking mechanism of the rental camera.

As shown in FIGS. 1 and 3, a biased-open reed switch 32 inside the camera body 12 is adapted to be closed by the lender to connect a motor 34 inside the camera body to the battery 18 in the chamber 20. When the battery 18 and the motor 34 are connected, the motor is powered to rewind exposed film into the film cartridge in a known manner. The exposed film must be rewound into the film cartridge before the film cartridge is removed from the camera body 12. An internal slide 36 beneath an exterior housing portion 38 of the camera body 12 has a triggering protuberance 40 within an elongate opening 42 in the exterior housing portion. See FIG. 3. The exterior housing portion 38 and the slide 36 have respective screw-holes 44 and 46 that are ordinarily aligned due to the urging of the slide (to the left in FIG. 3) by a return spring 48 to an original or first position separated from the reed switch 32. A locking screw 50 is screwed into the two screw-holes 44 and 46 to deter the customer from pushing the triggering protuberance 40 (to the right in FIG. 3) to move the slide 36 momentarily to a film rewind or second position against the reed switch 32 to close the reed switch. When the rental camera 10 is returned to the lender to unload exposed film and replace with fresh film, the locking screw 50 is removed from the two screw-holes 44 and 46 to permit the lender move the slide 36 momentarily to the film rewind position against the reed switch 32 to close the reed switch.

As shown in FIGS. 1 and 2, an internal slide 52 beneath an exterior housing portion 54 of the camera body 12 has a pair of identical latching hooks 56 that are adapted to mate with complementary receiving slots 58 projecting from the film door 14, to hold the film door closed, and has an unlocking protuberance 60 within an elongate opening 62 in the exterior housing portion. See FIG. 2. The exterior housing portion 54 and the slide 52 have respective screw-holes 64 and 66 that are ordinarily aligned due to the urging of the slide (upward in FIG. 2) by a return spring 68 to a locking or first position in which the hooks 56 are located in the slots 58 to hold the film door 14 closed. A locking screw 70 is screwed into the two screw-holes 64 and 66 to deter the customer from pushing the unlocking protuberance 60 (downward in FIG. 2) to move the slide 52 momentarily to an unlocking or second position removing the hooks 56 from the slots 58 to release the film door 14. When the rental camera 10 is returned to the lender to unload exposed film and replace with fresh film, the locking screw 70 is removed from the two screw-holes 64 and 66 to permit the lender to move the slide 52 momentarily to the unlocking position to release the film door 14.

As shown in FIG. 4, the battery door 16 has a resilient latching tab 72 with a screw-hole 74. When the battery door 16 is closed, the tab 72 fits into a latching slot 76 beneath a screw-hole 78 in an exterior housing portion 80 of the camera body 12, and the screw-hole 74 in the tab is aligned with the screw-hole in the exterior housing portion. A locking screw 82 is screwed into the two screw-holes 78 and 74 (in that order) to deter the customer from removing the exhausted battery 18 from the chamber 20. When the rental camera 10 is returned to the lender to unload exposed film and replace with fresh film, the locking screw 82 is removed from the two screw-holes 74 and 78 to permit the battery door 16 to be opened to replace the exhausted battery 18 with a fresh one.

The invention has been described with reference to a preferred embodiment. However, it will be appreciated that variations and modifications can be effected by a person of ordinary skill in the art without departing from the scope of the invention. For example, instead of a locking screw being screwed into an aligned pair of screw-holes as has been described, the locking screw can be screwed into a screw-hole in an exterior housing portion of the camera body and, instead of being screwed into a second hole in the manually operable member, the locking screw can simply be located substantially in contact with or closely in the way of an edge or other surface area 84 of the manually operable member in order to block the manually operable member from being moved. Alternatively, the locking screw can be screwed tightly against the manually operable member to firmly secure the manually operable member in place like a vise.

In the example of using an aligned pair of screw-holes, one or both of the screw-holes can be threaded.

Instead of a locking screw, other known removable locking devices such as snap-fasteners can be used in place of the locking screw.

PARTS LIST 10. rental camera
12. camera body
14. rear film door
16. battery door
18. battery
20. battery chamber
22. flash window
24. front viewfinder opening
26. taking lens opening
28. rear viewfinder opening
30. cartridge window
32. reed switch
34. motor
36. slide
38. exterior housing portion
40. triggering protuberance
42. elongate opening
44. screw-hole
46. screw-hole
48. return spring
50. locking screw
52. slide
54. exterior housing portion
56. latching hooks
58. receiving slots
60. unlocking protuberance
62. elongate opening
64. screw-hole
66. screw-hole
68. return spring
70. locking screw
72. latching tab
74. screw-hole
76. latching slot
78. screw-hole
80. exterior housing portion
82. locking screw
84. surface area

What is claimed is:

1. A camera comprising:

a camera body having a through-hole;

a manually operable member supported on said camera body for movement between first and second positions, and having a surface area substantially aligned with said through-hole in the camera body when said manually operable member is in said first position; and a locking device located in said through-hole in the camera body and in the way of said surface area of the manually operable member when the through-hole and the surface area are substantially aligned, to prevent movement of the manually operable member from the first position to the second position, and being removable from the through-hole to be out of the way of the surface area to permit movement of the manually operable member from the first position to the second position to unload exposed film from the camera and load fresh film into the camera.

2. A rental camera to be used by a customer for picture-taking, and intended to be returned to a lender to unload exposed film and replace with fresh film, said rental camera comprising:

a camera body having a screw-hole;

a manually operable member supported on said camera body for movement between first and second positions, and having a screw-hole aligned with said screw-hole in the camera body when said manually operable member is in said first position; and a locking screw located in said screw-hole in the camera body and in said screw-hole in the manually operable member when the two screw-holes are aligned, to prevent the customer moving the manually operable member from the first position to the second position, and being removable from at least the screw-hole in the manually operable member to permit movement of the manually operable member from the first position to the second position preparatory to the lender unloading exposed film and replacing with fresh film.

3. A rental camera as recited in claim 2, wherein a two-state switch is constructed to change its state to initiate film rewind, and said manually operable member is a manually moveable triggering member which has one of said screw-holes and which when moved from said first position to said second position changes the state of said two-state switch to initiate film rewind.

4. A rental camera as recited in claim 2, wherein said camera body includes a door that can be opened, and said manually operable member is a manually moveable latch which has one of said screw-holes and which in said first position latches said door to hold the door closed and in said second position unlatches the door to permit the door to be opened.

5. A rental camera as recited in claim 2, wherein said camera body includes an exterior housing portion which has one of said screw-holes and an elongate opening, and said manually operable member is an internal slide beneath said exterior housing portion which has the other screw-hole and a push protuberance protruding into said elongate opening to permit said push protuberance to be manually pushed for movement from said first position to said second position.

6. A method of deterring unauthorized reuse of a rental camera to be used by a customer for picture-taking, and intended to be returned to a lender to unload exposed film and replace with fresh film, said method comprising the steps of:

substantially aligning a through-hole in the camera body and a surface portion of a manually operable member supported on the camera body for movement between first and second positions when the manually operable member is in the first position; and inserting a locking device into the through-hole in the camera body and in the way of the surface portion of the manually operable member when the through-hole and the surface portion are substantially aligned, to prevent the customer moving the manually operable member from the first position to the second position, whereby when the locking device is removed from the through-hole the manually operable member can be moved from the first position to the second position preparatory to the lender unloading exposed film and replacing with fresh film.

7. A method of deterring unauthorized reuse of a rental camera to be used by a customer for picture-taking, and intended to be returned to a lender to unload exposed film and replace with fresh film, said method comprising the steps of:

aligning a screw-hole in the camera body and a screw-hole in a manually operable member supported on the camera body for movement between first and second positions when the manually operable member is in the first position; and inserting a locking screw into the screw-hole in the camera body and into the screw-hole in the manually operable member when the two screw-holes are aligned, to prevent the customer moving the manually operable member from the first position to the second position, whereby when the locking screw is removed from at least the screw-hole in the manually operable member the manually operable member can be moved from the first position to the second position preparatory to the lender unloading exposed film and replacing with fresh film.

8. A method of deterring unauthorized reuse of a rental camera to be used by a customer for picture-taking, and permitting a lender to whom the rental camera is returned to unload exposed film and replace with fresh film, said method comprising the steps of:

aligning a screw-hole in the camera body and a screw-hole in a manually operable member supported on the camera body for movement between first and second positions when the manually operable member is in the first position;

inserting a locking screw into the screw-hole in the camera body and into the screw-hole in the manually operable member to prevent the customer moving the manually operable member from the first position to the second position;

removing the locking screw from the two screw-holes; and moving the manually operable member from the first position to the second position preparatory to the lender unloading exposed film and replacing with fresh film.

9. A method of deterring unauthorized reuse of a rental camera to be used by a customer for picture-taking, and permitting a lender to whom the rental camera is returned to unload exposed film and replace with fresh film, said method comprising the steps of:

inserting a locking screw into a screw-hole in the camera body and into a screw-hole in a manually moveable triggering member that is to be moved from a first position to a second position to initiate film rewind, to prevent the customer moving the triggering member from the first position to the second position;

removing the locking screw from the two screw-holes; and moving the triggering member from the first position to the second position to initiate film rewind preparatory to the lender unloading exposed film and replacing with fresh film.

10. A method of deterring unauthorized reuse of a rental camera to be used by a customer for picture-taking, and permitting a lender to whom the rental camera is returned to unload exposed film and replace with fresh film, said method comprising the steps of:

inserting a locking screw into a screw-hole in the camera body and into a screw-hole in a manually moveable latch that is to be moved from a locking position to an unlocking position to unlock a door that than can be opened in order to unload exposed film and replace with fresh film, to prevent the customer from moving the latch to permit the door to be opened;

removing the locking screw from the two screw-holes; and moving the latch from the locking position to the unlocking position and opening the door to permit the lender to unload exposed film and replace with fresh film.

* * * * *